United States Patent [19]
Desrosiers

[11] 3,932,955
[45] Jan. 20, 1976

[54] ANIMAL TRAP

[76] Inventor: Wilfrid Desrosiers, 6 Cournoyer St., Kapuskasing, Ontario, Canada

[22] Filed: Apr. 2, 1974

[21] Appl. No.: 457,377

[52] U.S. Cl. .................................................. 43/81
[51] Int. Cl.² ........................................ A01M 23/30
[58] Field of Search ............ 43/81, 81.5, 82, 96, 92

[56] References Cited
UNITED STATES PATENTS

| | | | |
|---|---|---|---|
| 180,558 | 8/1876 | Davis | 43/96 |
| 2,562,417 | 7/1951 | Vorsey | 43/92 |
| 3,775,896 | 12/1973 | Gauthier et al. | 43/81 |

FOREIGN PATENTS OR APPLICATIONS

| | | | |
|---|---|---|---|
| 867,032 | 3/1971 | Canada | 43/82 |

Primary Examiner—Louis G. Mancene
Assistant Examiner—Peter K. Skiff

[57] ABSTRACT

An animal trap having a pair of back-to-back jaws for trapping an animal from either one of two opposed directions. The jaws are each made from a pair of substantially U-shaped rod or wire members, pivoted at their ends. A pair of opposed springs operate both jaws simultaneously.

1 Claim, 5 Drawing Figures

ANIMAL TRAP

This invention relates to an improved animal trap.

The invention is more particularly directed toward an improved animal trap of the type that kills an animal, as opposed to a trap of the type that catches an animal by a foot.

Killing traps must kill an animal within a certain maximum time to be approved for use by Humane Societies. Killing traps, to be most effective, should also be able to trap an animal travelling in either direction on its runway or path. No traps are presently known satisfying the above conditions.

It is therefore the purpose of the present invention to provide a trap of the above type which both kills an animal quickly, well within the specified time, so as to avoid undue suffering, and which is effective for trapping an animal approaching the trap from either direction on its runway.

The trap of the present invention is also very simple and relatively inexpensive to construct yet very powerful in operation. The trap is also relatively simple to operate.

The invention is broadly directed toward an animal trap having a first pivoted jaw and a second pivoted jaw with the jaws connected together back to back adjacent the pivots so as to have the jaws open in opposed or opposite directions. The trap has spring means for simultaneously clamping both jaws shut when the trap is sprung.

The invention is more particularly directed toward an animal trap having first and second jaws. The first and second jaws each comprise first and second substantially U-shaped members joined together at their ends with one member pivotable with respect to the other. The ends of both members in the first jaw are located adjacent the ends of both members in the second jaw. A pair of springs are provided for simultaneously operating the members in both jaws when the trap is sprung.

The invention will now be described in detail having reference to the accompanying drawings, in which.

Figure 1:
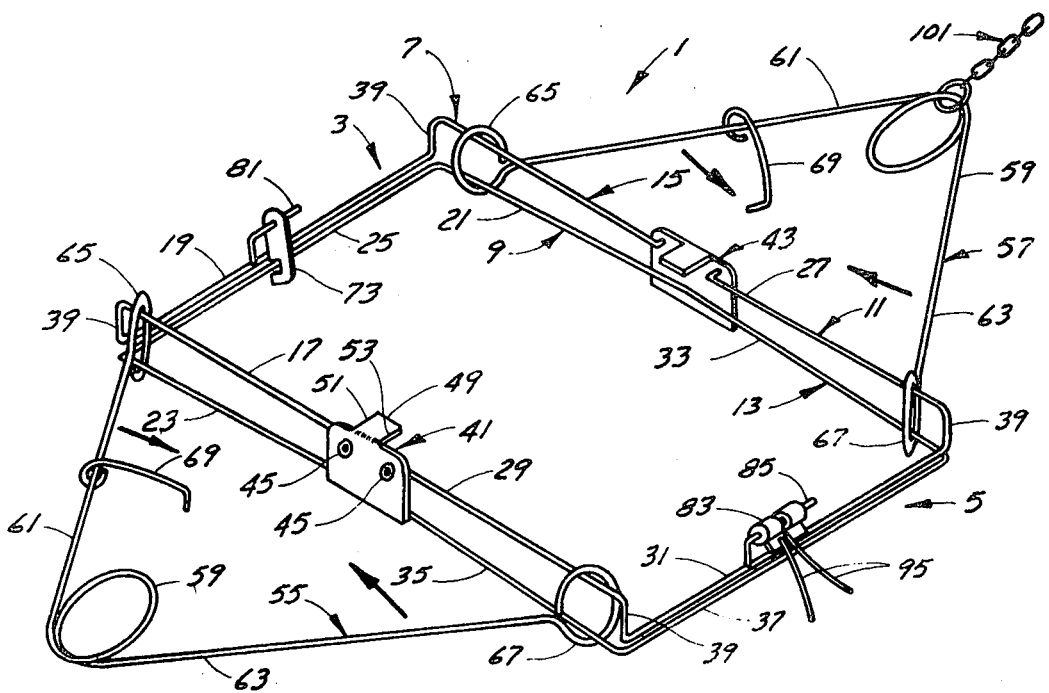
FIG. 1 is a schematic view of the trap of the present invention in the "sprung" position.
Figure 2:
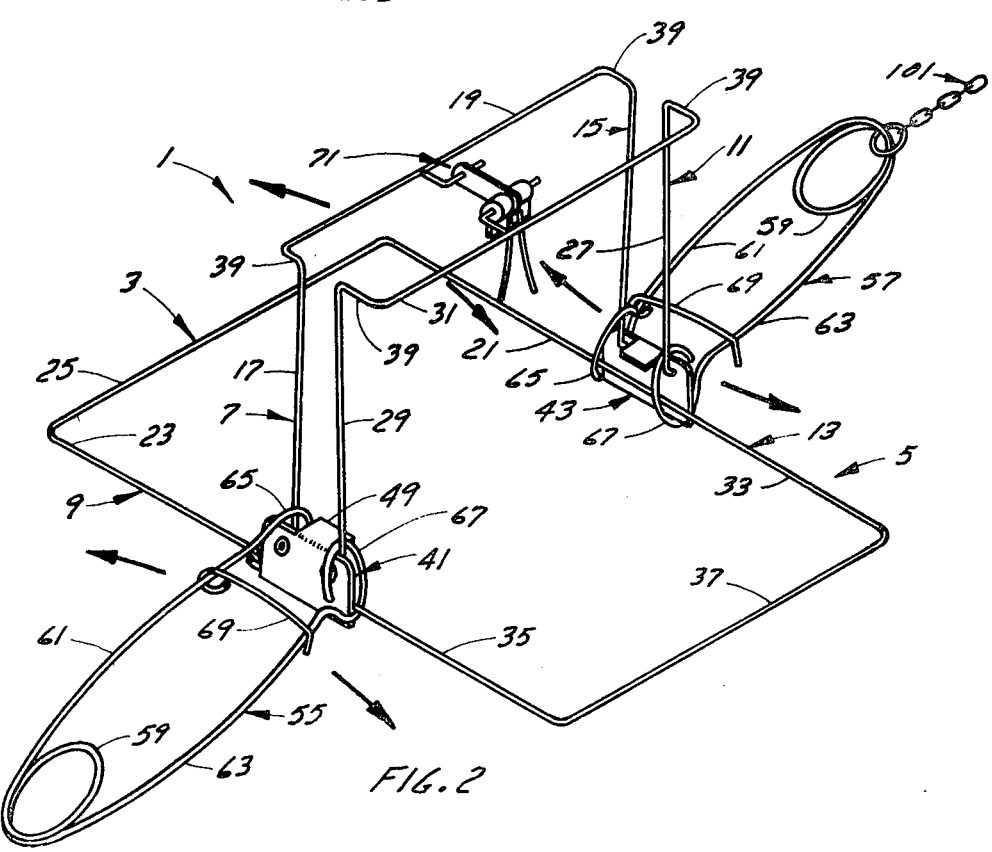
FIG. 2 is a schematic view of the trap in the "set" position.

As shown in FIGS. 1 and 2 of the drawings, the trap 1 comprises a first jaw 3 and a second jaw 5. Throughout this application, the word "jaw" is used to define a two-member clamping device, rather than one member (upper or lower) of a clamping device.

The first jaw 3 consists of a first, substantially U-shaped member 7 normally overlying a second substantially U-shaped member 9. Similarly, the second jaw member 5 consists of a first, substantially U-shaped member 11 overlying a second substantially U-shaped member 13. The first member 7 of the first jaw 3 has arms 15, 17 connected together by a cross bar 19. The second member 9 of the first jaw has arms 21, 23 connected together by a cross bar 25. Similarly, the first member 11 of the second jaw 5 has arms 27, 29 connected together by a cross bar 31 and the second member 13 has arms 33, 35 connected together by a cross bar 37. Jaw 3 is the same as jaw 5 but reversed in position. To this end, first member 7 is the same as first member 11, and second member 9 is the same as second member 13.

Preferably, the cross bars 19, 31 in the first members 7, 11 of the first and second jaws 3, 5 are offset from the arms by means of offset bends 39. This is to ensure that the cross bars 19, 25, and 31, 37 in both jaws abut when the trap is sprung.

Figure 3:
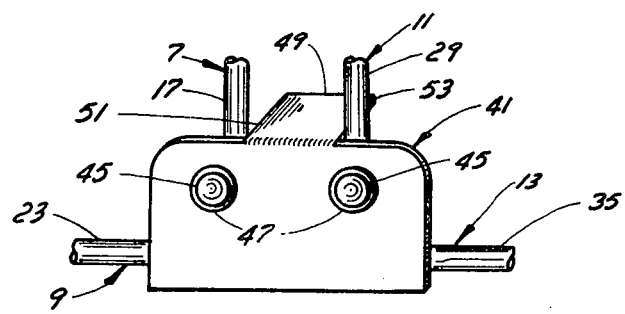
FIG. 3 is a detailed schematic view of one of the hinges in the trap.
Figure 4:
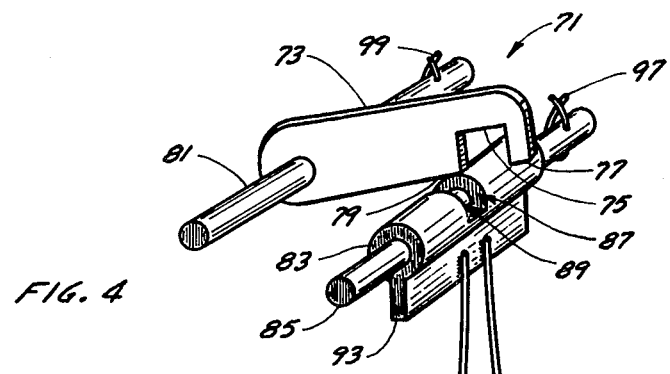
FIG. 4 is a detailed schematic view of the latch and trigger means of the trap.
Figure 5:
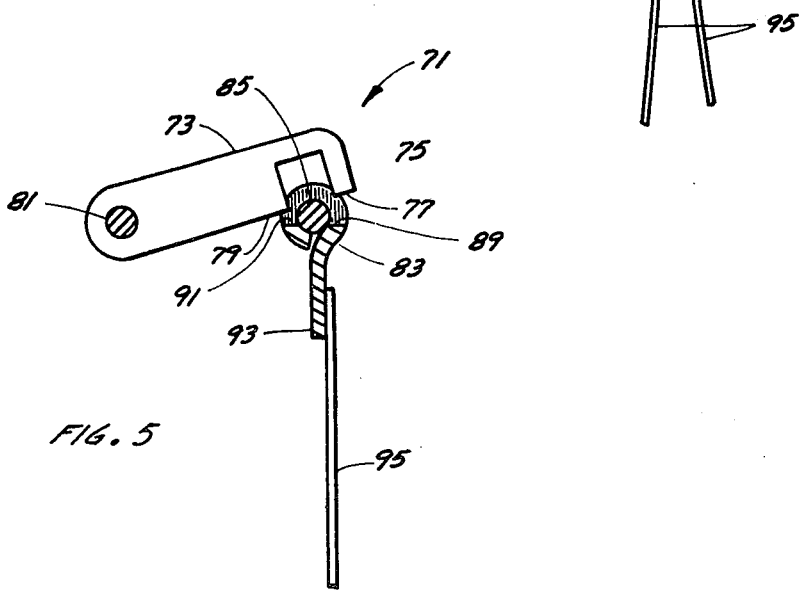
FIG. 5 is a cross-sectional view of the latch and trigger means of the trap.

Means are provided for joining the first and second jaws 3, 5 in back-to-back relationship, so that they open facing in opposite directions. Suitable joining means can comprise a pair of plates 41, 43 with the free ends of the arms 17, 23, 29, 35 connected to plate 41 and the free ends of arms 15, 21, 27, 33 connected to plate 43. The ends 45 of the arms 15, 17, 27, 29 of the first members 7, 11 are pivotably connected to the plates. To this end, the ends 45 of the arms of the first members are bent outwardly at a right angle and inserted through holes in the plates. The ends 45 are then upset onto washers 47, as shown in FIG. 3. This attachment permits the members of each jaw to pivot relative to one another so as to move between an open and closed position.

The ends of the arms 21, 23, and 33, 35 of the lower members 9, 13 are preferably welded to the side of the plates 41, 43 below the ends 45. Alternatively, members 9, 13 could be made from one looped piece of material, the loop welded at its sides to the plates 41, 43.

The plates 41, 43 are each preferably provided with an abutment 49 which comprises an extension from the top of the plates, bent at right angles to the plane of the plate, and extending inwardly. The abutment members provide shoulders 51, 53 limiting the movement of the first members 7, 11 of the first and second jaws, toward one another as they are pivoted up to set the trap. When the arms of members 7, 11 abut shoulders 51, 53, the members 7, 11 are in position to be latched.

Spring means are provided for closing the jaws of the traps simultaneously. Spring means preferably comprise first and second normally V-shaped springs 55 and 57. The springs are located on opposite sides of the trap, as shown in FIGS. 1 and 2. Each spring has a spring coil 59 at the base of the V-shape, with a pair of arms 61, 63 extending from the spring coil. Arms 61, 63 have a loop 65, 67 at their respective ends. These loops 65, 67 encircle the arms of the first and second members of the first and second jaws. Thus, loop 65 of spring 55 encircles arms 17, 23 on one side of jaw 3 and loop 67 of the same spring encircles arms 29, 35 on the same side of jaw 5. Loop 65 of spring 57 encircles arms 15, 21 on the other side of jaw 3 and loop 67 of the same spring encircles arms 27, 33 of the other side of jaw 5. Each pair of arms 17, 23; 15, 21; 29, 35; and 27, 33 diverge slightly moving toward the cross bars. At their outer ends, when the cross bars touch, each pair of arms are a distance farther apart than the diameter of the loops 65, 67. Thus, the loops cannot slip off the ends of the arms, when the springs are relaxed.

The springs 55, 57 are preferably made in one piece from suitable spring rod material bent to provide the coil 59 at the base and the loops at the end of the arms. Each spring can be provided with a hook 69 which is looped about one arm and hooks over the other arm, as shown in FIG. 2. The hooks 69 maintain the springs in a closed or locked position while the trap is being set.

Once the trap has been latched or "set", the hooks 69 are released to arm or activate the trap.

The trap includes latch means 71. Latch means 71 are provided for holding first members 7, 11 of both the first and second jaws together in a raised position when the trap is set. This latch includes a hook 73 which has a notch 75 near its free end defining shoulders 77, 79. The hook 73 is pivotably mounted at one end by a support bar 81 which is mounted on the cross bar 19 of the first member 7 of the first jaw 3. A tubular latch member 83 is rotatably mounted on a support bar 85 which in turn is mounted on cross bar 31 of the first member 11 of the second jaw 5. The tubular latch member 83 has a semi-circular slot 87 cut into it midway between its ends. The semi-circular slot 87 provides shoulders 89 and 91 on either side of the support bar 85.

When the trap is in a set position, the hook 73 rests in the slot 87 with its shoulders 77, 79 resting on the shoulders 89, 91 respectively.

The latch member 83 has an extension 93 from which a pair of wires 95 extend. The bait for the trap is mounted on the wires. Both the hook 73 and the latch member 83 are maintained on the support bars by suitable pins 97, 99. The pins can comprise a wire passing through a hole at the ends of the support bars or they can be cotter pins.

The trap can be provided with a staking chain 101 attached to any suitable part of the trap. As shown in FIGS. 1 and 2, the staking chain can be attached to the spring coil 59 on one of the springs 55, 57.

To operate the trap, bait is placed on wires 95. The springs 55, 57 are loaded by moving the loops 65, 67 of each spring toward one another, as shown by the arrows in FIG. 1, and then locking them in the loaded position with hooks 69. Members 7, 11 of the two jaws 3, 5 are then moved up toward each other and latched together by latch means 71. The loops 65, 67 are loose enough adjacent plates 41, 43 to permit members 7, 11 to be moved up with little or no force. The trap is placed in the runway in a position so it can be entered from either direction of the runway. The hooks 69 can then be released arming the trap. An animal becomes trapped when it enters the trap from either direction to get at the bait on wires 95. Pulling or pushing the wires causes member 83 to rotate in either direction, thus lifting hook, by either shoulder 89, 91, to clear bar 85. When the hook clears bar 85, both springs 55, 57 snap open to the position shown in FIG. 1 driving members 7, 11 down as loops 65, 67 slide out. Members 7, 11 crush the animal behind the head between either pair of cross bars 19, 25 or 31, 37, depending from which end the animal entered the trap. The animal is killed substantially instantaneously.

I claim:

1. An animal trap comprising a first and a second jaws connected together in back-to-back relation to open in opposite directions, spring means engaging said jaws and operable for simultaneously closing the jaws, latch means constructed and arranged to releasably hold the jaws in open position, each of said jaws including a first and a second substantially U-shaped members joined together at their opposite ends, and both first substantially U-shaped members of said jaws being fixedly and unitarily interconnected in end-to-end alignment and forming a fixed substantially flat support operatively underlying both said second substantially U-shaped members, a pair of plates rigidly secured to said flat support against the opposite sides thereof, said second U-shaped members pivoted to said plates at their ends, said plates forming abutments restraining pivoting of both second U-shaped members relative to both first U-shaped member.

* * * * *